No. 853,409. PATENTED MAY 14, 1907.
G. D. HOUSTON.
RIDING CULTIVATOR.
APPLICATION FILED DEC. 31, 1906.
3 SHEETS—SHEET 2.
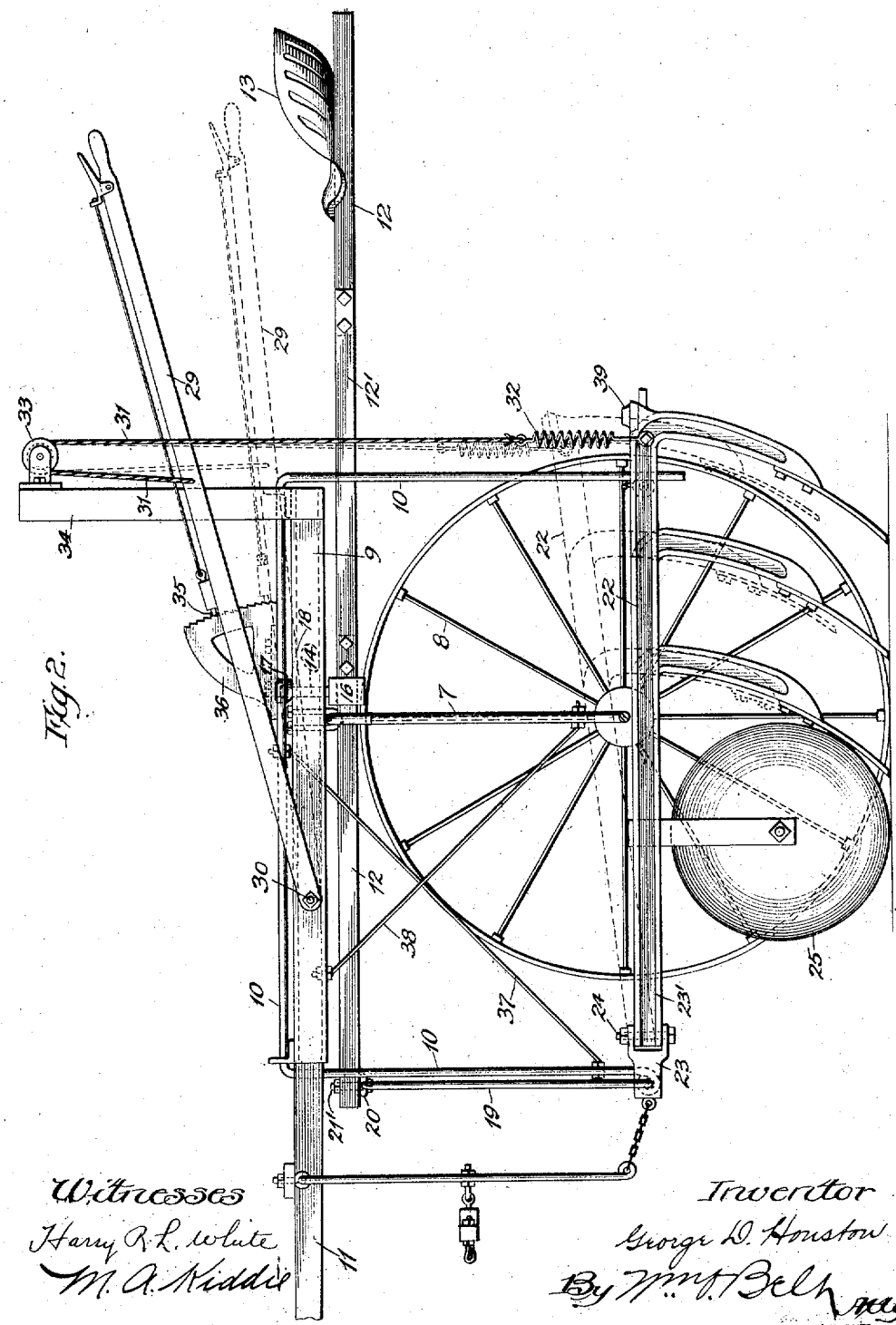
Witnesses
Harry R. L. White
M. A. Kiddie
Inventor
George D. Houston
By Wm. T. Belt, Atty.

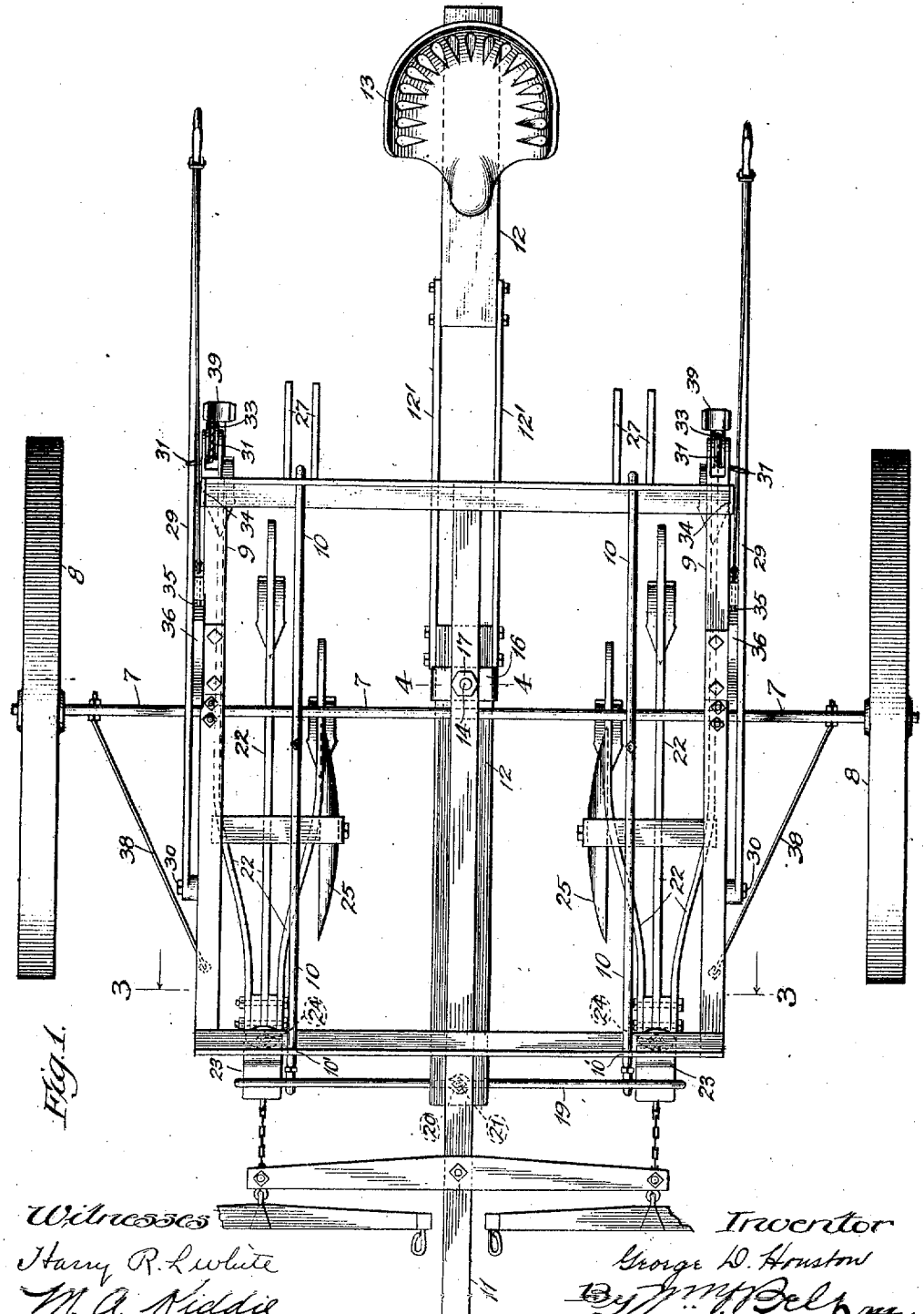

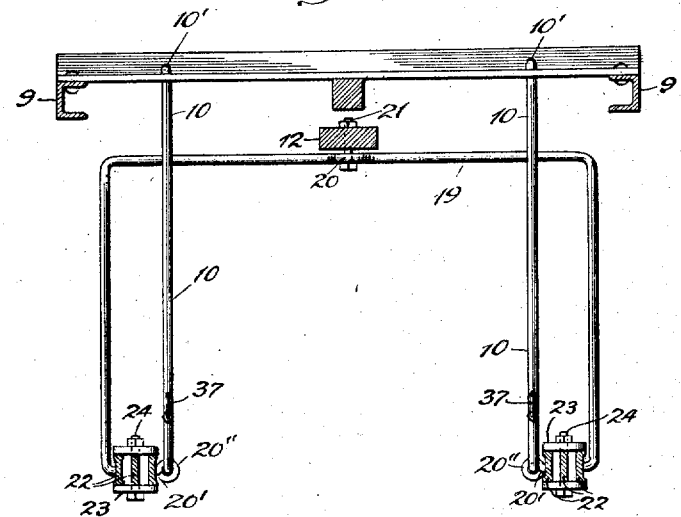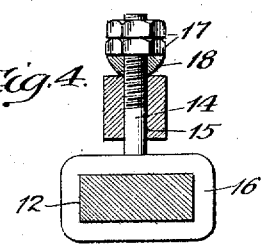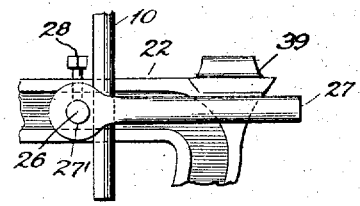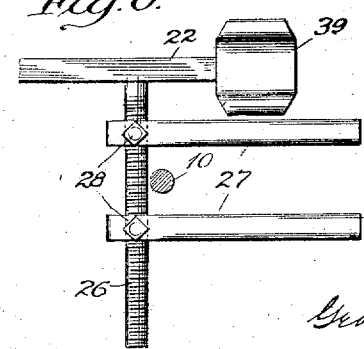

UNITED STATES PATENT OFFICE.

GEORGE D. HOUSTON, OF RUSHVILLE, ILLINOIS.

RIDING-CULTIVATOR.

No. 853,409.　　　Specification of Letters Patent.　　　Patented May 14, 1907.

Application filed December 31, 1906. Serial No. 350,136.

*To all whom it may concern:*

Be it known that I, GEORGE D. HOUSTON, a citizen of the United States, residing at Rushville, in the county of Schuyler and State of Illinois, have invented new and useful Improvements in Riding-Cultivators, of which the following is a specification.

This invention relates to improvements in riding cultivators for plowing corn and its object is, generally, to provide a cultivator of comparatively few parts and of simple and inexpensive construction which will have an easy and even draft and which can be easily and quickly adjusted and manipulated as occasion requires to cause the shovels to travel properly in the rows when plowing straight-way or cross-way without injury to the corn.

More specifically, the objects of the invention are to provide for an easy uniform lateral movement of the gangs to keep the shovels constantly at the same angle and parallel with the tongue; to keep the gangs at a predetermined distance from the row when plowing straight-way; to permit a free and independent adjustment of the gangs when plowing cross-way; to permit the seat lever support to move laterally and vertically; and to improve the details of construction and arrangement of parts to better accomplish the objects of the invention heretofore pointed out and others which will appear hereinafter in the detail description.

In the drawings illustrating one embodiment of the invention Figure 1 is a top plan view. Fig. 2 is a side elevation. Fig. 3 is a sectional view on the line 3—3 of Fig. 1. Fig. 4 is a sectional view on the line 4—4 of Fig. 1. Figs. 5 and 6 are detail views of the guide arms.

Referring to the drawings, 7 is an arched axle on the ends of which the carrying wheels 8 are mounted. A frame 9, preferably of rectangular shape, is supported on the axle and this frame supports the arch shaped hangers 10. The frame is preferably made of angle or channel iron and the hangers are preferably made of round bar iron, and are arranged in openings 10' in the frame so that they can swing on the frame without being displaced (Fig. 3).

A tongue 11 is fastened to the frame and a lever 12 forming a support for the seat 13 is pivotally supported beneath and to the tongue in a suitable manner which will permit the seat lever to swing laterally and vertically. This can be accomplished in various ways within the purview of my invention and in the drawings I have shown one way which comprises a bolt 14 passing through a longitudinal slot 15 in the tongue and provided with an eye 16 on its lower end to receive said lever and with lock nuts 17 on its upper end to secure the bolt in place. Between the nuts and the upper face of the tongue I may provide a washer 18 which has a rounded lower face to permit an easy swinging movement of the seat support longitudinally of the tongue. The bolt can of course swing to permit a free lateral swinging movement of the seat support.

An arch 19 has an eye 20 to receive a bolt 21 on the forward end of the seat support (Figs. 2, 3) and its ends 20' are turned inward and provided with eyes 20" with which the forward ends of the hangers are engaged. The beams of the gangs 22 are pivotally connected to these inturned ends of the arch 19 and I make each beam of two parts, one part 23 being pivotally mounted on the arch and the other part 23' being pivoted by a bolt 24 to the part 23. Thus the entire beam is capable of swinging vertically on the arch and the part 23' is capable of a lateral swinging movement on the part 23. Each gang may be provided with a disk fender 25. The rear ends of the hangers extend down behind inwardly projecting rods 26 secured on the gangs and between guide arms 27 adjustably mounted on these rods (Figs. 5, 6). Guides of various constructions and different methods of adjusting them may be employed but I have shown a simple construction in the drawings which consists in providing the rods with a screw-thread and providing the arms with threaded eyes 27' to screw on the rods. Thus the arms can be easily and readily adjusted as required and they may be permanently fixed in their adjusted position by screw bolts 28.

The gangs may be lifted clear of the ground by levers 29 pivoted to the frame at 30 and to which are attached ropes or chains 31 which are connected to coil springs 32, the latter being connected to the rear ends of the gangs. The ropes or chains travel over pulleys 33 mounted on standards 34 on the frame and the levers are provided with hand operated detents 35 arranged to engage the teeth of segments 36 on the frame.

The cultivator may be braced in any suitable manner as found desirable but I prefer to provide braces 37 at the front ends of the hangers and braces 38 connecting the axle to the frame. I also prefer to make the seat lever of skeleton form at 12', in front of the seat 13, so as to form the least amount of obstruction to the view of the rider.

The cultivator can be built entirely of metal or partly of metal and partly of wood and the construction of the various parts can be changed and varied as required to suit different conditions, without departing from the spirit or sacrificing the advantages of the invention.

The weight of the operator will balance the weight of the arch and the front end of the gangs and thus permit a free lateral movement of the gangs as may be required. This movement of the gangs is accomplished by swinging the seat lever and to facilitate this operation the gangs are provided with foot rests 39 conveniently located so that the operator can adjust the gangs by pressure of the foot on one or the other foot rest to swing the seat lever and move the gangs laterally together. As the arch 19 connects the hangers the parallel relation of the gangs will be maintained during their lateral movement and this keeps the gangs constantly in parallel relation with the tongue, generally speaking, and the shovels working at the same angle. The hangers will swing only a short distance but in arcs and for this reason I deem it desirable to provide for a vertical oscillation of the seat lever. The guides form a convenient adjustment for the rear end of the gangs to hold the gangs at a desired distance from the row when plowing straight-way. When plowing cross-way it sometimes happens that the corn has been dropped irregularly and it then becomes necessary to shift one or the other gang, or both, to clear the plant. The guides can be readily spaced apart to permit the gangs to be freely and independently adjusted by swinging them on the pivot pins 24. Thus the gangs are capable of uniform lateral movement especially desirable when plowing straight way and, by adjusting the guides they are also capable of an independent swinging movement to clear the corn in irregular hills when plowing crosswise. When the end of the row is reached or when transporting the cultivator from place to place the gangs can be readily lifted clear of the ground by operating the levers 29.

What I claim and desire to secure by Letters Patent is:

1. In a cultivator, the combination of a frame, a pair of parallel arch-shaped hangers supported to swing on the frame, the ends of said hangers being arranged in operative relation to the gangs, and means connected to the hangers for swinging the hangers simultaneously to move the gangs relative to the frame and in parallel relation.

2. In a cultivator, the combination of a frame, a pair of gangs, a movable arch connected to said gangs, hangers supported to swing on the frame and connected to the arch, and means for shifting the arch to move the hangers and gangs relative to the frame and in parallel relation.

3. In a cultivator, the combination of a frame, a pair of gangs, a movable arch connected to said gangs, hangers supported to swing on the frame and connected to the arch, and a lever movable vertically and laterally to shift the arch and thereby move the hangers and gangs relative to the frame and in parallel relation.

4. In a cultivator, the combination of a frame, a pair of gangs, an arch connected to said gangs, hangers supported to swing on the frame and connected to the arch, and a seat lever pivotally mounted to swing vertically and laterally for shifting the arch to thereby move the hangers and gangs in parallel relation.

5. In a cultivator, the combination of a frame, a pair of gangs, a movable arch connected at its ends to said gangs, arch-shaped hangers supported to swing on the frame, the forward ends of said hangers being connected to the ends of the arch and the rear ends of said hangers being arranged in operative relation to the rear ends of the gangs, and means for shifting the arch to move the hangers and gangs relative to the frame and in parallel relation.

6. In a cultivator, the combination of a frame, a pair of gangs, an arch connected at its ends to said gangs, parallel arch-shaped hangers supported to swing on the frame, said hangers being connected at their forward ends to the ends of the arch and having their rear ends arranged in operative relation to the rear part of the gangs, and a seat lever supported to swing vertically and laterally and connected to the arch, substantially as described.

7. In a cultivator, the combination of a frame, a pair of gangs, a movable arch connected to said gangs, a pair of parallel arch-shaped hangers supported to swing on the frame and connected at their forward ends to the ends of the arch, and guides on the gangs to receive the rear ends of the hangers for adjusting the hangers laterally.

GEORGE D. HOUSTON.

Witnesses:
HERMAN H. BROWN,
JNO. C. GRAFF.